J. KIEL.
WHEEL PLOW.
APPLICATION FILED JULY 7, 1914.
1,189,365.
Patented July 4, 1916.
2 SHEETS—SHEET 1.
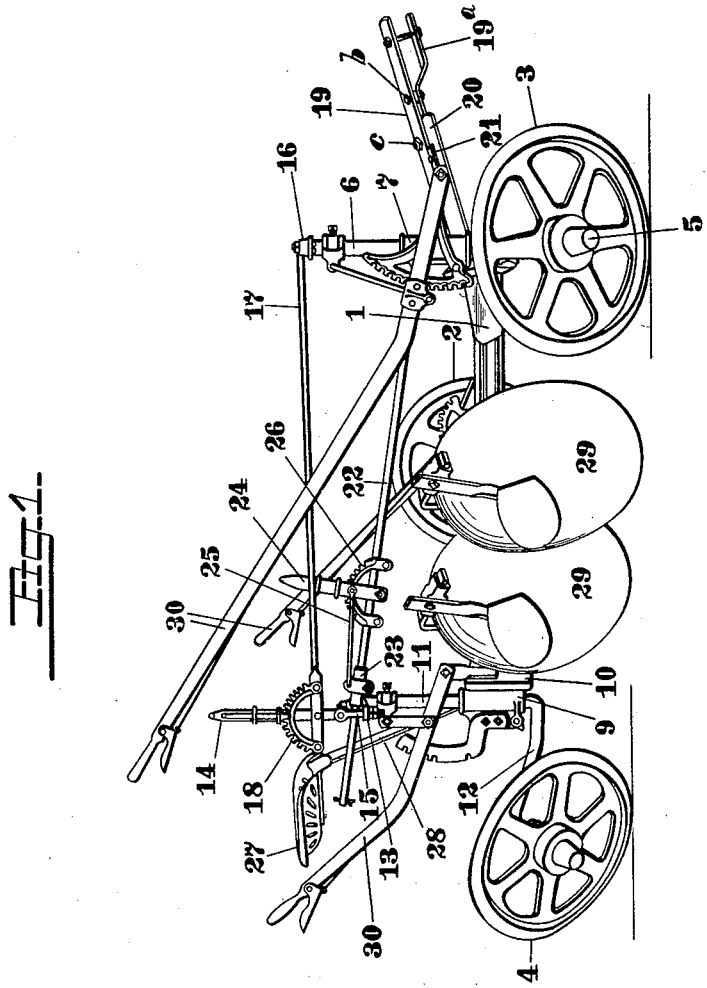

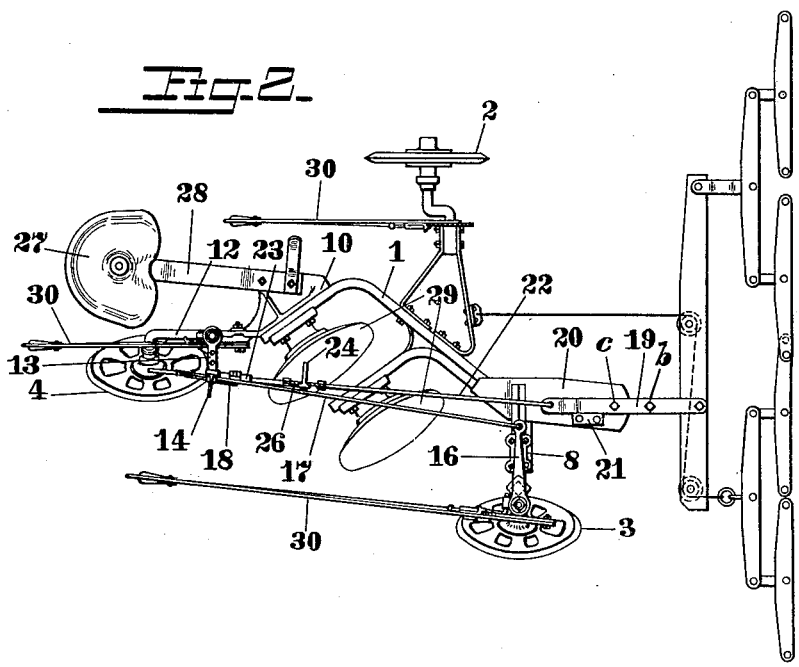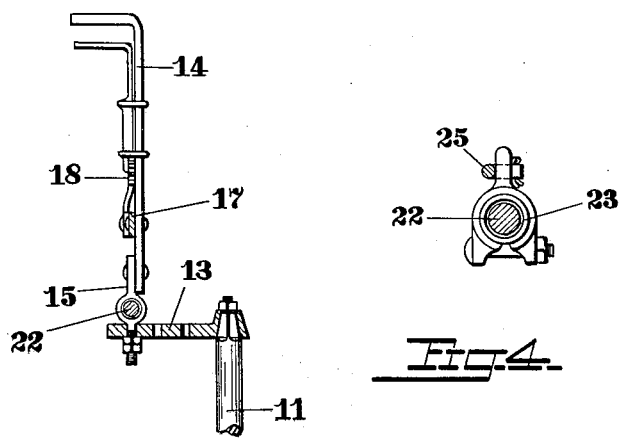

UNITED STATES PATENT OFFICE.

JOHN KIEL, OF MOLINE, ILLINOIS, ASSIGNOR TO DEERE & COMPANY, OF MOLINE, ILLINOIS, A CORPORATION OF ILLINOIS.

WHEEL-PLOW.

1,189,365.      Specification of Letters Patent.      Patented July 4, 1916.

Application filed July 7, 1914. Serial No. 849,378.

*To all whom it may concern:*

Be it known that I, JOHN KIEL, a citizen of the United States, residing at Moline, in the county of Rock Island and State of Illinois, have invented certain new and useful Improvements in Wheel-Plows, of which the following is a specification, reference being had therein to the accompanying drawing.

My invention relates to wheel plows, and more particularly to the means employed for control of the rear caster-wheel through connection with the draft means; the object of my invention being to secure such control and at the same time eliminate from the draft means the force of the side thrust of the caster-wheel.

Referring to the drawings in which similar numerals indicate identical parts—Figure 1 is a side elevation of a wheel plow embodying my invention. Fig. 2 is a plan view. Figs. 3 and 4 are details.

A frame 1 is supported on a land-wheel 2 and front and rear furrow-wheels 3 and 4. The front furrow-wheel 3 is mounted upon a laterally extending portion 5 of a crank-axle having a vertical spindle 6 supported in a bearing 7 on a bracket 8 secured on the frame 1. Journaled in a bearing 9 on a bracket 10 secured on the frame 1 is the vertical spindle 11 of a crank-axle having a rearwardly extending portion 12 which is bent laterally at its rearward end to form a support upon which is mounted the rear furrow-wheel 4. An arm 13 is rigidly secured to the upper end of the vertical spindle 11 and extends in a furrowward direction; a lever 14 is pivotally supported on a standard 15 on the arm 13. An arm 16 is rigidly mounted on the upper end of the spindle 6 and extends laterally of the machine; a steering rod 17 is pivotally connected to the free end of this arm 16 and extends rearwardly, its rearward end being pivotally connected to the lever 14 above the pivotal connection of the latter to the standard 15, and having a semi-circular rack 18 with the teeth of which a latch on the lever 14 is adapted to engage.

Draft links 19, 19ª, are secured together by a bolt *b* and are pivotally mounted on opposite sides of a pole plate 20 on a pivot *c* common to both links, the pole plate 20 being secured on the frame 1 in any suitable manner; a draft equalizer is supported on the forward end of the links 19, 19ª, and may be of any type desired. The draft links are substantially parallel with the line of draft, and are capable of swinging in a furrowward direction only, a stop 21, secured to the pole plate 20, preventing a landward movement.

Pivotally connected to the draft link 19 is a steering rod 22 projecting rearwardly and through an opening in the standard 15 in which it is loosely confined; a stop 23 is slidably mounted on the rod 22 and is connected to a lever 24 by a link 25; the lever 24 is supported on the rod 22 and is provided with an ordinary latch to engage with the teeth of a rack 26 also supported on the rod 22. Plowing disks 29 are carried by the frame 1, their depth of operation being determined by adjustment of the frame on the supporting wheels by the actuation of levers 30 in a well known manner. A seat 27 is mounted on a support 28 secured on the bracket 10, and is in convenient reach of all the levers.

When the plow is in operation the resistance of the ground to the plow in the furrow tends to swing the rear end of the plow landward, and to overcome this the rear furrow-wheel 4 travels in the last furrow and is held rigidly in position and prevented from swinging furrowward by the standard 15 on the arm 13 contacting with the stop 23 on the rod 22; as usually constructed, a stop is provided to operate against the furrowward side of the rearwardly extending portion 12 of the rear crank axle; this is a decided inconvenience and a cause of delay in the operation of the implement. As the arm 13 is actuated by the turning of the vertical spindle 11 it carries with it the lever 14 to which the rod 17 is connected, and as the lever 14 is normally locked to the rack 18 on said rod, it follows that the arm 16, to which the rod is connected forwardly, will also be moved to turn the spindle 6 and the wheel 3 so that the movement of the furrow-wheels 3 and 4 is simultaneous, the furrow-wheel 3 being also independently adjustable by the operation of the lever 14 as more fully described in Patent Number 641,222, issued to S. D. Poole, January 9, 1900.

In many devices for controlling the rear furrow-wheel by a connection between the latter and the draft mechanism the force of the thrust of the wheel 4 is exerted to one side or the other of the line of draft, increasing any difficulty ordinarily experienced in plowing a straight furrow. In my device the steering rod 22 is connected to the draft link 19 furrowward of a line drawn through the pivot of the standard 15 and pivot $c$ of the link 19, the stop 21 however retains the draft link 19 parallel with the line of draft when the plow is moving straight ahead, consequently the entire force of the thrust of the furrow-wheel 4 is sustained by the link 19 against the stop 21.

In turning the plow in a furrowward direction the draft link 19 swings away from the stop 21 drawing the steering rod 22 forward and permitting the wheel 4 to swing to follow the new direction, the wheel 3 swinging simultaneously. In turning landward the draft link 19 remains in contact with the stop 21, but as the wheel 4 is free to swing in a landward direction, it readily adjusts itself to such a turning movement.

It will be seen that with my improvement the plow accomplishes an easy right hand movement, and when again employed in cutting a straight away furrow the draft is undisturbed by the force of the thrust of the rear furrow-wheel 4, and the guidance and operation of the plow is much simplified.

As shown in the drawings, the stop 23 may be adjusted to give greater or less angularity of lead to the rear furrow-wheel 4, by actuating the lever 24; I do not confine myself to this construction, however, as the lever may be dispensed with and the stop be made adjustable in other ways or rigidly secured to the rod 22.

What I claim is—

1. In a wheel plow, the combination of a frame, supporting wheels therefor including front and rear caster-wheels, a draft device pivotally supported on the frame and turnable in one direction only, means connecting the caster-wheels to control the forward caster-wheel by the rear caster-wheel, and means connecting the draft device and the rear caster-wheel to govern the movement of the latter in one direction only.

2. In a wheel plow, the combination of a frame, supporting wheels therefor including front and rear caster-wheels, a draft device pivotally supported on the frame and turnable in one direction only, means connecting the two caster-wheels to control the forward caster-wheel by the movement of the other, and means connecting the draft device and the rear caster-wheel and on which said caster-wheel is free to swing in one direction and adapted to swing in the other direction when the draft device is turned on its pivot.

3. In a wheel plow, the combination of a frame, supporting wheels therefor including front and rear caster wheels, a draft device pivotally supported on the frame and turnable in a furrowward direction only, means connecting the caster wheels one with the other, means connecting the draft device and the rear caster wheel to arbitrarily swing both caster wheels in one direction when the draft device is turned in its pivot, said caster wheels being free to swing simultaneously in the opposite direction.

4. In a wheel plow, the combination of a frame, supporting wheels therefor including front and rear caster wheels, a draft device pivotally supported on the frame and turnable in a furrowward direction only, means connecting the caster wheels one with the other, means connecting the draft device and the rear caster wheel to arbitrarily swing both wheels in one direction, a stop on said connecting means to control the swing of said wheels with the turn of the draft device, said caster wheels adapted to swing freely and simultaneously in the opposite direction.

5. In a wheel plow, the combination of a frame, supporting wheels therefor including front and rear caster wheels connected one with the other, a draft link pivotally supported intermediate its ends on the frame and extending substantially parallel with the line of draft, a rod connected to said link rearward of the pivot thereof, said rod extending rearwardly to the rear caster wheel and having a stop thereon to limit the swing of both caster wheels in one direction, both of said caster wheels being free to swing simultaneously in the opposite direction.

6. In a wheel plow, the combination of a frame, supporting wheels therefor, including front and rear caster wheels connected one with the other, a draft link pivotally supported intermediate its ends on the frame and extending substantially parallel with the line of draft, a stop to limit the turning of said link on its pivot to one direction only, a rod connected to said link rearward of the pivot thereof and extending rearwardly and landwardly and connected with the rear caster wheel, and a stop on said rod to limit the swing of both caster wheels in one direction, both of said caster wheels being free to swing simultaneously in the opposite direction.

In testimony whereof I affix my signature, in presence of two witnesses.

JOHN KIEL.

Witnesses:
BERTHA A. MAURER,
W. G. DUFFIELD.

Copies of this patent may be obtained for five cents each, by addressing the "Commissioner of Patents, Washington, D. C."